UNITED STATES PATENT OFFICE.

AMBROSE G. FELL, OF NEW YORK, N. Y.

MANUFACTURE OF GLUCOSE.

SPECIFICATION forming part of Letters Patent No. 268,653, dated December 5, 1882.

Application filed June 5, 1882. (No model.)

*To all whom it may concern:*

Be it known that I, AMBROSE G. FELL, of New York city, in the county and State of New York, have invented a new and useful Improvement in the Manufacture of Glucose, which improvement is fully set forth in the following specification.

This invention has reference to the manufacture of glucose or sirup from corn or other grain, and particularly from the former. Heretofore the method generally employed has been first to separate the starch by such means as are employed for the purpose in the ordinary starch-manufacture, and then by acids and heat to convert the starch into glucose. Objection arises to this mode from the loss of gluten and also of a portion of the starch, and of the native saccharine matter, dextrine, and other soluble elements of grain. The gluten is in the manufacture of the starch dissolved by the alkalies or acids, whichever may have been used, or, if the old starch method is employed, by the frequent and prolonged use of much water in the processes of soaking and washing the grain. In either case the nitrogenous constituents of the grain, which constitute the main animal nutrition, are entirely lost. As it is impossible to prevent loss by the mechanical manipulations, the percentage of starch obtained cannot represent the whole amount originally in the grain. The native saccharine matter of the corn, being soluble, becomes a loss in the starch-manufacture, and its absence is very discernible in the insipidity of glucose made from said starch, the native dextrine and other soluble elements, as I have said, being also lost. Another method of obtaining glucose from corn is to treat the corn in a more or less divided condition with a solution of sulphuric acid and with heat, or, as described in a late patent, with oxalic acid, and then to proceed as if starch were used. The objections to this mode of treatment are more serious than the loss and expense incidental to the starch method, for while it is true that the soluble native saccharine elements of the corn are saved, thus increasing the sweetness and quantity of the product obtained, still the carbonization and solution of a considerable portion of the gluten take place, and the presence of it or its compounds in the final product is very objectionable in producing bad flavors, (in this more than counteracting the presence of native sugar,) in darkening the color, in destroying the clearness, and in promoting decomposition of the sirup, if kept for any length of time. An improvement on these methods is set forth in Patent No. 241,202, granted to me on the 10th day of May, 1881, wherein the grain is subjected to the action of a compound acid and heat, by means of which and by proper regulation of the temperature many of the objections referred to are obviated; but it is found in practice almost impossible to regulate and gage the temperature when working on a large scale so as to obtain a uniform result or to entirely prevent the formation of objectionable compounds produced by the action of the acids on certain elements of the grain. It is found that while the use of the compound acid described, together with the regulation of temperature and the after employment of sulphurous-acid gas in the vacuum-pan, greatly tends to the avoidance of the objections set forth, still it is practically impossible to control all the conditions so as to obtain the most desirable results.

The present invention obviates the necessity of so closely watching the temperature by providing means for subsequently removing any objectionable compounds produced by the action of the acid on the fiber or gluten of the grain; and the means employed, as hereinafter described, are applicable also to impure saccharine solutions obtained by the action of plain sulphuric or other acids on grain, and equally applicable to the treatment of liquor obtained by saccharifying starch in the ordinary method of glucose-manufacture. I prefer, however, the employment of the compound acid referred to in the patent above mentioned, because it shortens the time required to convert the starch into glucose, and because, also, it produces less of the objectionable compounds to be afterward removed. By the present improvement the grain is treated with an acid solution (preferably a mixture of sulphuric and nitric acid) in any suitable vessel, and at such temperature as necessary to convert the starch and other convertible elements into glucose. The acid in the saccharine solution thus obtained is then neutralized by any suitable means, lime carbonate being generally employed. The clear solution is next separated from the insoluble portions of the grain by filtration, preferably by means of the apparatus described in my Patent No. 241,203, dated May 10, 1881. The liquor is next concentrated by boiling in a vacuum-pan to about 30° Baumé. During such concentration deterioration in color may be prevented by the introduction of sulphurous-acid gas into the vacuum-pan, as described in my said Patent No. 241,202. It is at this stage of the process that the more important feature of the present improvement can be most conveniently introduced, and by means of which the disregard of particular temperatures is made possible, a feature which distinguishes the present process from that described in my said Patent No. 241,202. The solution, having been concentrated to about 30° Baumé, is filtered to remove all precipitates produced by the concentration, and is next placed in an air-tight vessel and therein subjected to the action of sulphurous-acid gas under pressure, as described in my Patent No. 254,471, dated March 7, 1882, by means of which treatment the color is not only improved, but the sulphurous acid, by reason of the pressure under which it is applied, is brought into such intimate contact with the impure glucose solution as to rapidly oxidize, combine with, or neutralize the effects of those objectionable compounds or elements to which are due the bad flavors so noticeable in glucose produced by the direct action of acids on grain, and also more or less noticeable in liquor obtained by the treatment of starch with acid. The liquor under treatment with the sulphurous gas is from time to time tested by drawing out a suitable sample, and the treatment continued until the liquor is sufficiently purified. The sulphurous acid is then removed from the liquor by filtration through animal charcoal, after which it is further concentrated by boiling to any desired gravity, and finally filtered through cloth by means of a press and put into barrels for market.

The following description will better enable those skilled in the art to which the invention relates to make use of the same.

No particular quantity of grain is required for treatment in accordance with this invention; but for convenience I will describe the proportions of materials and conditions preferred for treating, say, six thousand pounds of corn. An open wooden tank, of about eleven feet in diameter and five feet deep, is employed, which tank is provided with about one hundred and fifty feet of closely-perforated lead pipe for admittance of steam, and has a rake or stirrer similar to those employed in the mash-tuns of breweries. The tank is filled about thirty inches deep with water, (by weight about fifteen thousand pounds,) and with this one hundred and twenty pounds of sulphuric acid, 66° Baumé, and fifteen pounds of nitric acid, 36° Baumé, are well mixed with stirrers. Steam is turned on, and when the acidulated water has attained a temperature near the boiling-point, and the stirrer being in motion, the corn, preferably in the form of coarse meal, is added and the heat and agitation continued for an hour or more, until all the starch and convertible elements of the grain have been converted into glucose, which is ascertained by means of the usual iodine or alcohol tests, as well understood. The solution, with the undissolved portions of the grain suspended therein, is now drawn off into a suitable vessel provided with a stirrer, and sufficient carbonate of lime, either in the form of whiting or marble dust, is added, and the agitation continued until all the acid is neutralized. The mass is then drawn off and filtered in a suitable filtering-tank, such as described in my aforesaid Patent No. 241,203, and in this tank the mass is kept agitated until it becomes too thick to be conveniently moved by means of the stirrer, the perfectly clear saccharine solution running off, and the gluten and other insoluble elements of the grain remaining in the filter. The outlets for the clear liquor are now stopped, and the tank is refilled with boiling water, in which the insoluble residue of the grain is well washed by means of the stirrer. The water dissolves out the balance of the sulphate of lime produced in neutralizing the acid in the converter. Nearly all the lime salts have, however, remained dissolved in the clear saccharine solution, and are separated as shown hereinafter. The wash-water from the tank is allowed to run out, the same as the original saccharine solution, but into a separate tank, where it remains until required for use in treatment of a fresh quantity of meal, in place of pure water, thus preventing the loss of the saccharine matter which it contains. The thick residue is next forced out of the tank into a press by means of the same stirrers used for agitation. In the press the residue is squeezed to as near dryness as practicable and can be used for cattle-food; or, if slightly salted, in order to counteract its insipidity due to extraction of saccharine matter, and then dried by any convenient means, it constitutes a palatable and wholesome food for horses, and will not spoil by keeping. The thin saccharine solution is next drawn into a vacuum-pan, such as used in the ordinary sugar-refinery, except that in this case the pan is provided with a perforated coil or pipe, through which sulphurous-acid gas can be drawn into the pan. During the operation of boiling sulphurous-acid gas is introduced into the liquid. It is or may be produced by burning sulphur in a stove in a current of air made by the vacuum of the pan, cooled by passage through water contained in a small tank, and it is, in a purified condition, introduced by means of the perforated coil into the boiling liquid of the vacuum-pan. The use of sulphurous acid during the process of boiling is to bleach any coloring-matter which may be produced in that operation, thus preserving the bright color of the saccharine solution during concentration. As the liquor is concentrated the lime salts produced by neutralizing the acids used are gradually precipitated, and when the liquor attains the gravity of 30° Baumé it is drawn off from the pan and filtered, by which means the lime salts are separated. The half-concentrated sirup is next conveyed to a close vessel and treated therein with sulphurous gas under pressure in the manner described in my Patent No. 254,471; but in this present treatment with sulphurous gas an effect is produced of much greater importance than the bleaching of the liquor—to wit, the neutralization of the elements mentioned, which imparts to the finished article the flavors so noticeable in glucose obtained by direct action of acids on grain.

The foregoing is the plain method of proceeding; but for economic and other reasons, it may be desirable to vary these details. For instance, for the sake of economizing the acid, and to obtain a more concentrated solution direct from the converter in the first instance, instead of turning off steam as soon as iodine ceases to yield a blue starch reaction, more nitric acid may be added, say, seven or eight pounds. The sulphuric acid does not require renewal. Half as much more meal (three thousand pounds) may now be added and proceeded with as in the first instance. A more concentrated saccharine solution is obtained, but it is proportionately more difficult to separate by filtration, owing to the increased density. The concentration of the solution may be carried to any point by these means, the difficulty of separation from the undissolved portion of the grain being the objection; or the liquor may at this stage be subjected to the sulphurous-acid treatment described; or the grain or its meal may have been subjected to the convertory action of the acid in a close converter under pressure of steam, instead of in the open tank described, for temperature is not of such importance where the liquor is subsequently treated with the sulphurous gas, as set forth; or the saccharine solution may have been filtered through the animal charcoal before being boiled in the vacuum pan. This treatment with sulphurous-acid gas under pressure for the removal of objectionable flavors is equally applicable to the treatment of glucose solutions obtained by other means than that indicated—for instance, that obtained by the action of acids on starch which has been previously separated from the grain, and the improved flavor and condition of the glucose by such treatment is independent of, and in addition to, the bleaching effect described in Patent No. 254,471.

I do not in this application broadly claim the treatment with acid and heat of grain or starch obtained therefrom. Neither do I claim the treatment of a solution of glucose with sulphurous gas under pressure; but What I do claim, and desire to secure by Letters Patent, is—

1. The method of treating grain or other starch-containing substances, or the starch itself, with acid or other agent capable of converting said starch into glucose, and then treating the saccharine solution thus obtained with sulphurous gas under pressure, substantially as and for the purpose set forth, said sulphurous-acid treatment, in connection with the action of the acid or other converting agent, forming successive steps in the one process for the manufacture of glucose.

2. The improvement in the manufacture of glucose, consisting in treating grain or other starch-containing substance, either whole or ground, by means of heat, with water containing acid or acids, or other agent capable of converting into glucose the starch and other convertible elements, then neutralizing the acids, separating the saccharine solution from the undissolved portions of the grain, and treating the solution thus obtained with sulphurous-acid gas under pressure, substantially as and for the purpose set forth.

3. In the manufacture of glucose, the method of treating the saccharine solution after the conversion of the starch and separation of insoluble elements of the grain by boiling the saccharine solution in a vacuum-pan to concentrate said solution, and then treating it with sulphurous-acid gas under pressure, substantially as and for the purpose set forth.

4. The improvement in the manufacture of glucose, consisting in treating grain or other starch-containing substance, or the starch itself, with the compound of sulphuric and nitric acid specified, and subsequently treating with sulphurous-acid gas under pressure to remove matters which impart a bad flavor to the product, substantially as described.

In testimony whereof I have signed this specification in the presence of two subscribing witnesses.

A. G. FELL.

Witnesses:
JOHN M. CLURE,
LOUIS M. FULTON.